UNITED STATES PATENT OFFICE.

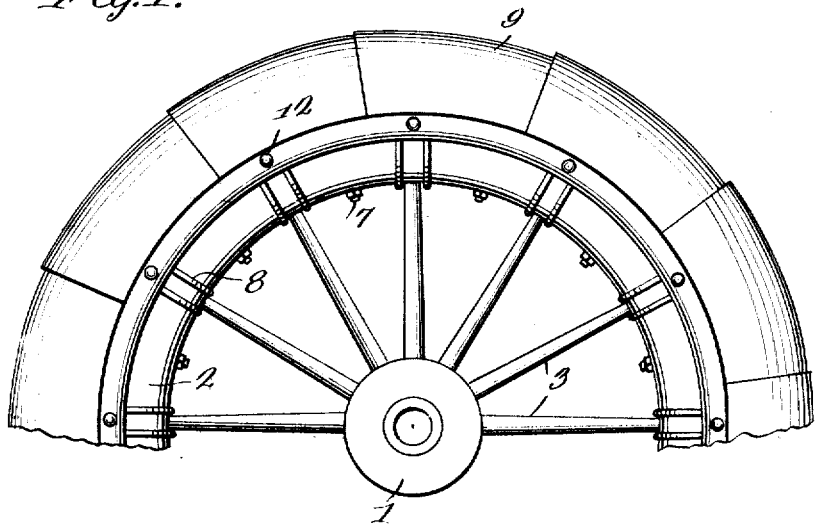
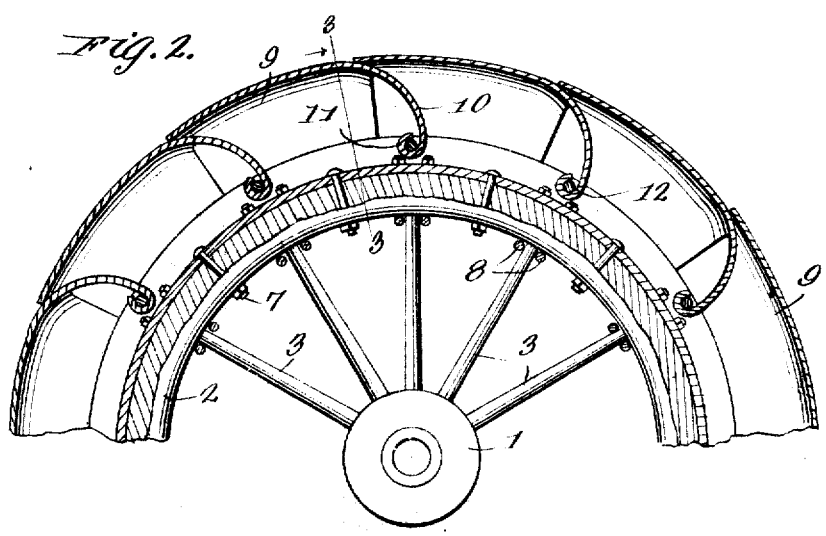

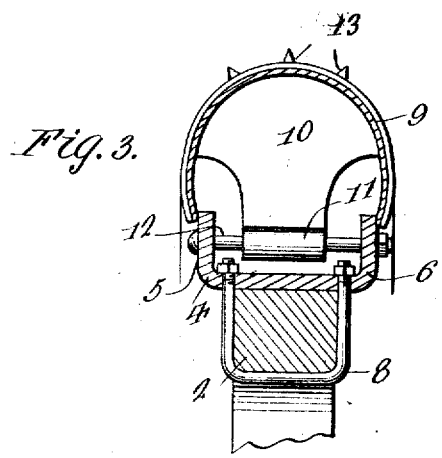
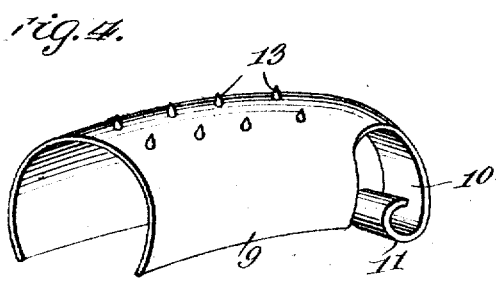

LINNIE LEROY GIVLER, OF CASTLE ROCK, MONTANA.

TIRE.

1,258,108.     Specification of Letters Patent.     Patented Mar. 5, 1918.

Application filed September 30, 1914. Serial No. 864,324.

*To all whom it may concern:*

Be it known that I, LINNIE L. GIVLER, a citizen of the United States, residing at Castle Rock, in the county of Rosebud and State of Montana, have invented certain new and useful Improvements in Tires, of which the following is a specification.

An object of my invention is to provide a cushion tire comprising a plurality of spring members mounted in an interfitted relation to form a tread for the wheel to which the spring members are applied.

A further object is to so construct and mount the several members that an interlocking structure is formed.

A still further object is to provide a plurality of members, which may be fitted in interlocked relation, while being also connected to the wheel, and in which each member coöperates with the next adjacent member.

With other objects in view, which will be referred to, my invention consists in the peculiar combination and novel arrangement of parts, such as will be hereinafter more fully described in connection with the accompanying drawings and more particularly pointed out in the appended claims.

In the drawings:—

Figure 1 is a view in side elevation of the upper portion of a wheel with my tire applied thereto.

Fig. 2 is a vertical sectional view taken through the structure disclosed in Fig. 1.

Fig. 3 is a transverse sectional view taken on the line 3—3 of Fig. 2 and looking in the direction indicated by the arrow.

Fig. 4 is a view in perspective of one of the spring members comprising the structure of the tire.

The wheel comprises the hub 1 and the felly 2 which members are secured together by the spokes 3, 3 in the usual manner, and it will be understood that the wheel may be made of a construction and design to be adapted for use on a carriage, wagon, motor vehicle, or other vehicle adapted to be drawn or propelled over the roads.

A rim 4 having the upturned flanges 5 and 6 provided at the edges thereof is mounted on the felly 2 and is secured in place by the bolt 7 passed therethrough and through the felly and also by the U-shaped clips 8 which are fitted around the felly and are secured through the rim at their ends.

The several spring members each comprise a body portion 9 which is made tubular in form with one side thereof open and is curved throughout its longitudinal extent, the arc on which the spring member is formed being of a radius slightly greater than the radius on which the rim member 4 is formed. A spring tang 10 is provided to extend from one end of the body portion 9 and the opposite end is left open, the structure of these parts being better disclosed in Figs. 2 and 3. The spring tang 10 of each of the members is bent downwardly and then around to form an eye 11 and the pins or bolts 12 are mounted across the rim member 4 between the flanges 5 and 6 thereof to have the eye portions of the spring tangs 10 fitted thereto.

In assembling the spring members of the tire, the end of a member having the spring tang 10 is inserted in the open end of the next adjacent member and due to the tubular shape of the several members these parts will be held to form a ring shaped structure around the rim member 4 and the side edges of the bodies of the several members will be fitted over the outside faces of the flanges 5 and 6 of the rim member 4. The pins or bolts 12 are then inserted through the aperture provided therefor in the flanges 5 and 6 to be received in the eye 11 of each of the spring members and the parts are thus secured in the desired relation.

If so desired, other means for securing the rim member 4 to the felly 2 of the wheel can be employed and also the curve of the spring tang 10 can be varied to obtain a greater or lesser spring action at that point. In the disclosure in Figs. 3 and 4, the spring members are illustrated as provided with a plurality of spikes or studs 13 on the tread portion thereof. It will be understood that in lieu of these studs or spikes the tread portions of each of the members might be roughened to provide an anti-slipping tread and further that leather, a fabric, or other suitable material might be secured to the tread portion of each of the spring members to provide a resilient tread and one which will deaden the noise of traffic.

In the use of the tire, when pressure is transmitted to the spring members through the support of the load by the wheel or through the encountering of obstructions in the road over which the wheel is traveling, the body portions 9 of the spring members are each brought to bear at their open end against the spring portion of the next adjacent member and the spring tang provides a supporting structure at that end of the body portion, this structure permitting an action very much resembling the action obtained by the use of a pneumatic tire. As the members are fitted together due to the fact that each member in cross-section presents perhaps two-thirds of a complete circle, the fitting of each member within the open end of the next adjacent member will form a structure in which each part will aid in securing the other members of the device against displacement. Further it will be seen that should one of the spring members become worn or broken, this member can be removed and a new spring member inserted to take the place thereof and the tire will have the initial efficiency.

While I have herein shown and described one specific form of my invention, it will be understood that slight changes might be made in the form and arrangement of the several parts without departing from the spirit and scope of my invention, and hence I do not wish to be limited except for such limitations as the claims may import.

I claim:—

1. A tire comprising a rim member having flanges upturned at the side edges thereof, a plurality of spring members each consisting of a body portion made in the form of a hollow cylinder with one side thereof open to receive the flanges of said rim, each of said members being provided with a spring tang extending from one end thereof and bent to form an eye, said members being assembled by placing that end of each member provided with the spring tang within the open end of the next adjacent member, and pins mounted through the flanges of the rim and through the eyes of the spring tangs to mount the members upon the rim.

2. A tire comprising a rim member having upstanding flanges formed at each of the side edges thereof, and said rim adapted to be mounted on the felly of a wheel, a plurality of spring members each consisting of a hollow substantially cylindrical body curved throughout its length and open at one side to receive the flanges of said rim, said members having the edges thereof at the open side slightly drawn in, each of said members being provided with a spring tang extending from one end thereof and bent to terminate in an eye, said spring members being formed to be assembled by placing the end of each member having the tang thereon within the open end of the next adjacent member in which relation the sides of the outer member hold against the inner member to prevent displacement of the various members outwardly, and pins placed through the flanges of the rim and through the eyes of the tangs to mount the members upon the rim.

3. A tire comprising a rim member adapted to be mounted on the felly of a wheel and provided with upstanding flanges at each of the side edges thereof, a plurality of spring tread members each consisting of a body portion made of substantially cylindrical form with one side thereof cut away sufficiently to permit fitting of the same to embrace the flanges of the rim, said spring tread members being curved throughout their length and each provided with a spring tang extending from one end thereof at the outer side, said spring tangs being bent to form eyes, and a plurality of pins mounted through the flanges of the rim to extend transversely thereacross at points above the base of the rim and to pass through the eyes of the tangs to assemble the members in such relation that the open end of each member fits over that end of the adjacent member having the spring tang carried thereby whereby the parts are assembled so that the free end of each member is resiliently supported by the adjacent member.

In testimony whereof I affix my signature in presence of two witnesses.

Mr. LINNIE LEROY GIVLER.

Witnesses:
M. JAY STRAUL,
F. H. SWAN.